Patented Mar. 27, 1951

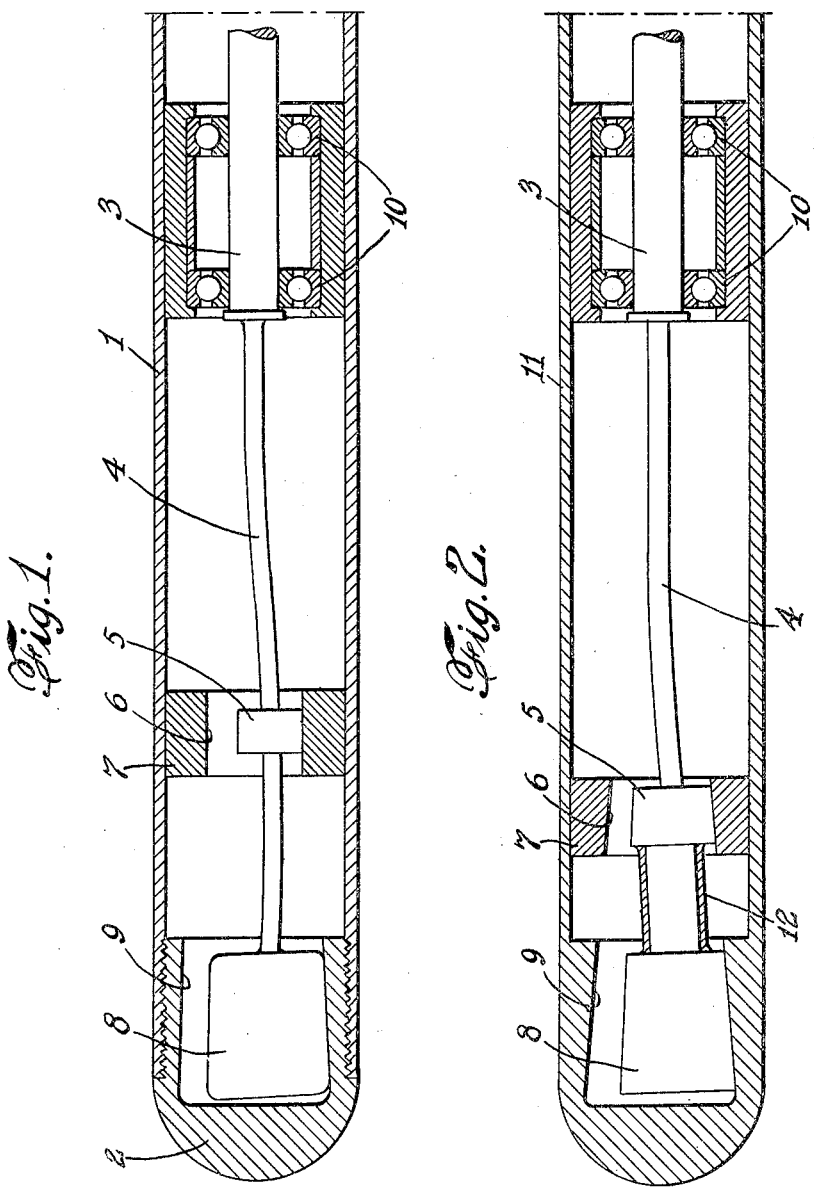

2,546,806

UNITED STATES PATENT OFFICE 2,546,806

VIBRATING DEVICE

Harald Svenning Wenander, Stockholm, Sweden

Application October 22, 1947, Serial No. 781,421
In Sweden October 26, 1946

6 Claims. (Cl. 74—87)

The present invention relates to improvements in vibrating devices of the type in which a rotary member fixed at one end of a rotatable shaft performs a planetary movement contacting a surface of revolution provided inside a cylindrical casing, said shaft being journaled only at its other end and the shaft and the rotary member thus are forming a conical pendulum.

In general, in such vibrating devices the pendulum shaft is either journaled in a spherical ball bearing or the like or it is connected to a driving shaft by means of a universal joint. Neither of these constructions has, however, proved to be satisfactory as they are both subjected to a quick wear owing to the high number of revolutions occuring in such devices. Moreover, in using spherical ball bearing it has proved to be next to impossible to obtain a sufficient packing for the interior of the casing.

According to the invention the inconveniences as referred to above are wholly eliminated in that the journaled end portion of the shaft is rigid and secured against radial displacement while the remaining part of the shaft is flexible or springing and thereby permits the planetary movement of the rotary member. Preferably the rigid shaft end is supported in two bearings as for instance ball bearings, spaced from each other and thus serving as a guide for said end. The rigidness of the latter prevent any springing in the bearings.

As not containing any link coupling or similar parts highly subjected to wear the vibrating device according to the invention is appreciably more durable than constructions of the prior art. To obtain a reasonable life for bearings or universal joints in devices before known the frequency (i. e. the number of oscillations made by the rotary member during a unit of time) and the centrifugal force must not reach such high values as desired. The apparatus according to the invention permits operation at a frequency and a centrifugal force considerably higher than before and also the problems of packing are dissolved in a simple way as the rotating shaft is guided and not oscillates at the sealing place.

In the drawings Figs. 1 and 2 show in section two embodiments of the apparatus according to the invention. Similar indications refers to corresponding details in the figures.

The vibratory member or casing comprises a tubular member or cylinder 1 in one end of which a bottom member 2 is mounted. This construction in two parts is only a matter of convenience from the manufacturer's point of view. The outer thicker end 3 of the rotatable shaft is guided in two ball bearings 10 disposed at a distance from each other in the outer portion of the casing. The thicker shaft end has a diameter sufficiently large to prevent any springing in the bearings. Thus said portion of the shaft is centered and directed in parallel to the longitudinal direction of the casing. A packing before known in per se and not shown in the drawings may be provided inside the inner bearing to prevent lubricant in the bearings from running in into the casing. The shaft portion 4 located inside the bearings 10 has a smaller diameter to permit a desired springing or flexibility and at its outer end it carries a rotary member 8 which in a known manner is adapted to roll against a surface 9 of revolution arranged in the bottom portion 2 of the casing.

When said shaft 4 is rather long, as is generally the case, it will be subjected to a great centrifugal force and owing to this it may have a tendency to break at high speed of rotation. According to another feature of the invention this risk may be wholly eliminated in that at least one additional rotary member having smaller dimensions is fixed on the shaft between its ends to serve as a support for the shaft, said additional member being adapted to contact a corresponding surface of revolution likewise provided in the casing. Obviously more than one such member may be provided, if desired.

In Fig. 1 there is shown such a supporting member 5 adapted to contact the inner surface 6 of a ring 7 inserted in the casing 1. In general, only one supporting member is used and, as shown in Fig. 1, this one then is placed at a distance from the rotary member 8 of substantially ⅓ of the length of the flexible shaft 4. As being easily confirmed by mathematical calculation the relation between the circumferences of the rotary member 8 and its contacting surface 9 may be the same as the relation between the circumferences of the supporting member 5 and its contacting surface 6 and this for the purpose of maintaining substantially the same frequency for both members 5 and 8 thus preventing any slipping between surfaces contacting each other. Moreover the diameter of the member 8 and that of the member 5 may be fitted in relation to each other to cause as little stresses as possible in the rotatable shaft when said members are rolling against their corresponding surfaces of revolution at normal operation.

In Fig. 2 there is shown another embodiment according to the invention. The casing 11 is here shown as being made in one single piece but obviously it can also comprise two separate portions, as seen in Fig. 1. According to this embodiment the rotary members 5 and 8 are rigid connected to each other, for instance by means of a tubular member 12 welded to said members 5 and 8. The connection may also be of any other shape. Thus said members will act as one single extended assembly having two separate contacting surfaces. If desired, this construction may also be made in an integral portion.

As shown in Fig. 2 the rigidly connected members 5 and 8 are contacting two surfaces of revolution 6 and 9 respectively. Both members may, however, contact a common surface, provided that their distance to each other isn't too great.

Such a rather heavy assembly, as shown in Fig. 2, may be of particular advantage when the difference between the diameters of the members 5 and 8 and the diameters of their contacting surfaces is not great and the springing shaft at the same time is relatively long. In such case I will obtain a very good efficiency of vibrations without causing the shaft to be bent in some greater extent.

The construction, shown in Fig. 2, provides a stabilizing of the pendulum movement together with an essentially more equal distribution of the pressure acting against the contacting surface or surfaces which circumstances results in a more uniform wear.

In vibrating devices hitherto used and having conical pendulums the generatrix for the surface of revolution and the generatrix for that part of the rotary member contacting said surface are generally directed towards the fulcrum of said pendulum, as for instance a spherical ball bearing or an universal joint. In the vibrating device according to the invention, however, the rotary member and its shaft in reality don't form a conical pendulum as said shaft is flexible or springing, and in this case said generatrices thus will be directed at a point located at a distance inside the bearings 10. In the case of a flexible shaft being provided between the members 5 and 8, as shown in Fig. 1, the generatrices of the member 8 and its cooperating surface 9 will not be directed at the same point as corresponding generatrices of the member 5 and the surface 6 but the latter generatrices will be directed at a point more adjacent the bearings 10.

It is to be understood that the device as described and shown herein is for the purpose of illustration and that various changes and modifications may be made without departing from the spirit and scope of the invention as set forth in the appended claims.

I claim:

1. A vibrating device comprising an outer casing, a rotary member having a surrounding surface of revolution and being fixed at one end of a rotatable shaft journaled at its other end, which member performs a planetary movement contacting a corresponding surface of revolution provided inside said casing, the journaled end portion of said shaft being rigid and secured against radial displacement and the remaining part of the shaft being flexible, at least one additional rotary member mounted on said flexible shaft portion between the ends thereof contacting a corresponding surface of revolution inside the casing and thereby serving as a support for the flexible shaft portion to prevent excessive flexing of said flexible shaft.

2. A vibrating device comprising an outer casing, a rotary member having a surrounding surface of revolution and being fixed at one end of a rotatable shaft journaled at its other end, which member performs a planetary movement contacting a corresponding surface of revolution provided inside said casing, the journaled end portion of said shaft being rigid and secured against radial displacement and the remaining part of the shaft being flexible, and at least one additional rotary member mounted on said flexible shaft portion between the ends thereof contacting a corresponding surface of revolution inside the casing and thereby serving as a support for the flexible shaft portion the diameters of the rotary members in relation to each other being such as to prevent excessive flexing of the flexible shaft portion and cause a minimum stress in the bent flexible shaft when said members contact their corresponding surfaces of revolution.

3. A vibrating device comprising an outer casing, a rotary assembly consisting of two members having spaced surrounding surfaces of revolution and being rigidly connected to each other in the longitudinal direction of said casing, one of said members being fixed at one end of a rotatable shaft journaled at its other end, which assembly performs a planetary movement contacting corresponding surfaces of revolution provided inside said casing, the journaled end portion of said shaft being rigid and secured against radial displacement and the remaining portion of the shaft being flexible to permit the movement of said rotary assembly, the engagement of said spaced surfaces of the rotary assembly with the casing serving as a support for the flexible portion of the shaft to prevent excessive flexing of said flexible shaft portion.

4. A vibrating device comprising an outer casing having two axially spaced internal surfaces, a rotary member having two axially spaced external surfaces of revolution corresponding to said internal surfaces of the casing and being fixed at one end of a rotatable shaft journaled at its other end, which member performs a planetary movement contacting the corresponding surfaces of revolution provided inside said casing, the journaled end portion of said shaft being rigid and secured against radial displacement and the remaining part of the shaft being flexible to permit the movement of said rotary member.

5. A vibrating device comprising an outer casing, a rotary member having two axially spaced external surfaces of revolution and being fixed at one end of a rotatable shaft journaled at its other end, the journaled end portion of said shaft being rigid and secured against radial displacement and the remaining part of the shaft being flexible, and at least one additional rotary member mounted on said flexible shaft portion between the ends thereof so as to prevent excessive flexing of said shaft, said rotary members being adapted to perform a planetary movement contacting corresponding surfaces of revolution provided inside the casing.

6. A vibrating device comprising a tubular outer casing closed at one end, a shaft comprising a rigid portion rotatably journaled in the other end of the casing and held against radial and angular displacement of its axis and a flexible portion extending inwardly from the rigid portion toward the closed end of the casing, and a rotary assembly fixed on the flexible shaft portion and adapted to perform a gyrating movement in the casing upon rotation of the shaft with consequent bending of the flexible portion of the shaft, said rotary assembly comprising masses distributed axially along the shaft and having axially spaced surfaces of revolution engaging corresponding spaced portions of the casing to prevent excessive flexing of the flexible shaft portion.

HARALD SVENNING WENANDER.

REFERENCES CITED

The following references are of record in the file of this patent:

UNITED STATES PATENTS

| Number | Name | Date |
|---|---|---|
| 2,174,452 | Torrison | Sept. 26, 1939 |

FOREIGN PATENTS

| Number | Country | Date |
|---|---|---|
| 70,055 | Norway | Feb. 11, 1946 |
| 99,474 | Sweden | July 23, 1940 |
| 541,057 | Great Britain | Nov. 11, 1941 |
| 630,831 | France | Dec. 9, 1927 |